J. F. STEWARD.
GRAIN-BINDER.
No. 195,413. Patented Sept. 18, 1877.
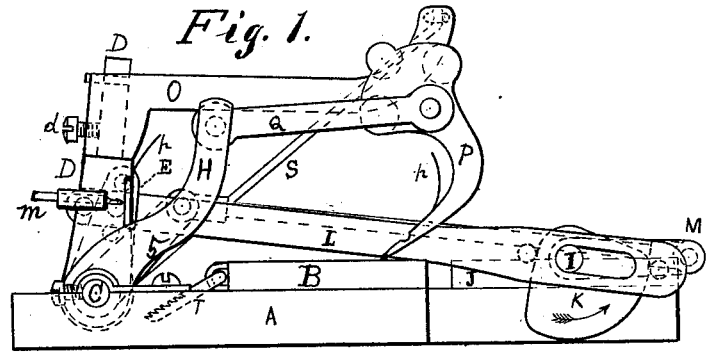
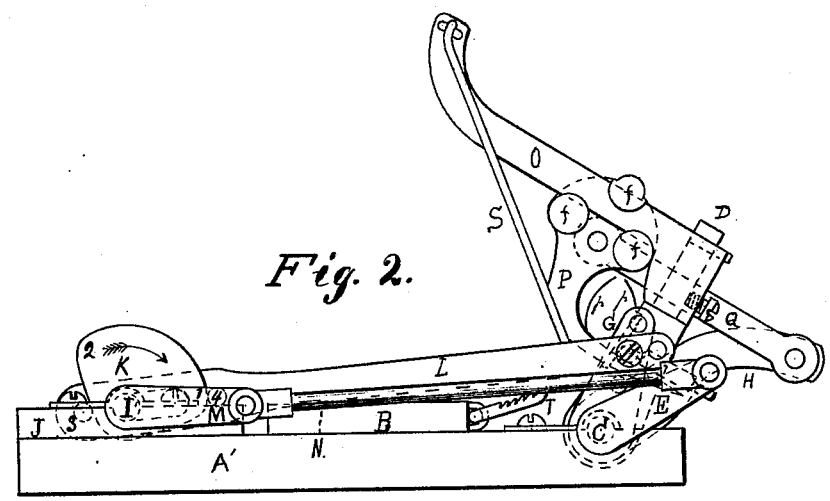
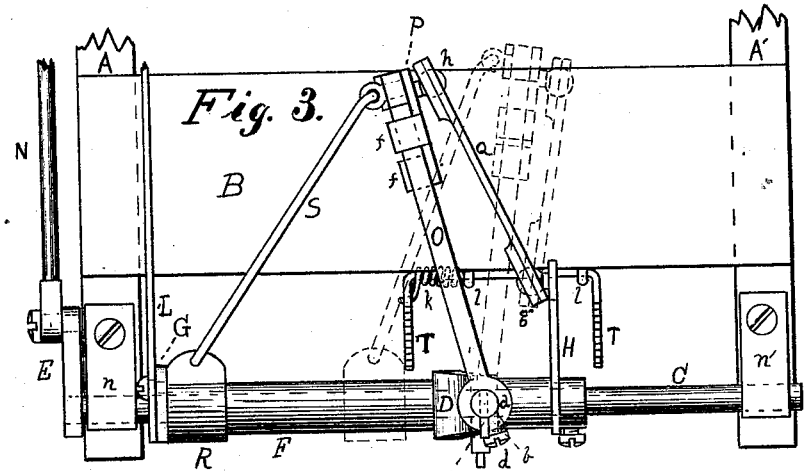
Witnesses;
Rosewell Thompson,
A. Steward.
Inventor;
John F. Steward.

UNITED STATES PATENT OFFICE.

JOHN F. STEWARD, OF PLANO, ILLINOIS, ASSIGNOR TO ELIJAH H. GAMMON AND WM. DEERING.

IMPROVEMENT IN GRAIN-BINDERS

Specification forming part of Letters Patent No. 195,413, dated September 18, 1877; application filed August 24, 1877.

*To all whom it may concern:*

Be it known that I, JOHN F. STEWARD, of Plano, in the county of Kendall and State of Illinois, have invented new and useful Improvements in Grain-Binders, of which the following is a full description, reference being had to the accompanying drawings, in which—

Figure 1 is a front-end view; Fig. 2, a rear-end view; and Fig. 3, a plan view.

The object of my invention is to provide a means for taking the loose grain from the receiver and compressing it preparatory to being bound; to effectually deliver the bundle from the machine after the process of binding; to easily and quickly provide for the adjustment of the wire to the proper position upon the gavel; to provide a support for the gavel during the process of binding and setting free the completed bundle; to so construct the bundle-support as to prevent said bundle from being drawn backward by its straws having become tangled (as in lodged grain) into those of the following one while it is being carried upward during the process of securing the band.

A A' may be parts of the usual frame-work of a harvester, with B, a part of the receptacle for the cut grain, mounted thereon. C is a shaft, having bearings in *n n* upon the bars A A', upon which are mounted the arm D and crank E. F is a sleeve surrounding the shaft C, having secured to it the crank G and arm H. I is a short shaft journaled in the bearing J, having upon its forward end the cam K, for giving motion to the crank G by means of the connection L.

The crank M gives motion to the crank E through the connection N. The wrist of M is given a sufficient length to serve as a means of operating it.

Upon the top of D is mounted the slide-bar O, said slide-bar being hinged, as shown in Fig. 3, to allow a swinging adjustment in the direction of the length of the grain.

The sleeve *a*, forming the hub of the swinging arm O, is provided with a notch, *b*, whose sides, coming in contact with the pin *e* in the stem of the arm D, form a stop, which prevents the arm O from being swung too far in either direction.

The set-screw *d* may be used to fix the arm in any position, if desired.

R is a collar sliding on the sleeve F, connected with the arm O by the rod S. Upon the arm O is the sliding wire-carrier P, said arm giving the wire-carrier an upward-and-downward movement. The wire-carrier is fitted to move from end to end of the slide-bar O, being secured by guides *f f f*, or anti-friction roller, above and below the arm.

The extremity of the bar O is given the upward turn shown in Figs. 1 and 2, which gives the point of the wire-carrier a greater amount of forward throw, allowing the point to strike more directly into the grain upon the receiver.

Connecting the outward extremity of the arm H with the wire-carrier P is the bar Q, secured to each by the ball-and-socket joints *g* and *h*.

T is a rack for the support of the grain while it is being carried over the space through which the completed bundle is to be forced. It is supported by the staples *l l*, and held in a horizontal position by the spring *k*. The upper surface of its fingers are serrated, as shown.

*m* is the twister, which may be driven in any convenient manner. Its operation need not be described, as it will be fully understood by reference to my patent of February 15, 1876, No. 173,511.

The form of hook shown is found in practice to be preferable to that of the former patent.

The operation of my device is as follows: If the grain is short, the slide-bar O is swung forward to the position shown by dotted lines in Fig. 3. This is done by moving the sleeve R. In practice, suitable connection is made between the sleeve R and the driver's position, to enable him to make any adjustment of the bar O that the varying length of the grain may demand. The cut grain is delivered from the platform of the harvester in the usual manner upon the receiver B, the different parts standing in the position shown in the rear view, Fig. 2. When sufficient grain is received for a bundle the mechanism is put in motion in the direction shown by the arrows upon the cam K.

It will be seen that the sleeve F, with the arm D, is held in the position shown in Fig. 2 by the cam K and connection L. As the arm H is rocked over inward by means of the connection Q the wire-carrier is taken out upon the slide-bar O and over the accumulated grain to the position for descent into the grain. So far the cam K has revolved till its verge 1 has reached the pin 3 and the verge 2 has reached pin 4. Upon further revolution of the shaft I the cam K will exert itself, through the connection L, to carry the rocking sleeve F with its arm D over, and the bar O mounted thereon downward, to the position shown in front view, Fig. 1. The cam K is now in position to prevent any further movement of the arm D and bar O. While the effort of the crank M is exerted to rock the shaft O over, outward, and through the arm H and connection Q, the sliding wire-carrier P, taking with it the gavel, which, in the operation, has been encircled by the wire, is placed in position for the completion of the process of binding, as shown in Fig. 2. The springs $p$ are designed to give compression to the bundle. The cam K is so shaped that, while the sliding wire-carrier P approximates the stationary position, after having carried the wire into the twister, the parts are carried over and upward to the position shown in Fig. 2. During the last movement the twisting and cutting mechanism has been operated. When the revolution of the shaft I is continued, the cam K being in the proper position, Fig. 2, further movement of the arm D and bar O is prevented; but the motion of the crank E takes the wire-carrier out to the extremity of the bar O over the grain, preparatory to being forced down through it, the cam K acting to produce the latter operation. After the operation of binding, the bundle is released by the reverse movement of the carrier, when it drops upon the supports T, where it remains till the part 5 of the arm H, Fig. 1, forces it down through the opening between the binding mechanism and the receiver B, or so low that the next gavel will be advanced over it.

It will be seen that during the process of binding the compressed bundle is carried upward. To prevent the previously-bound bundle, whose straws are likely to be entangled with it, from following, the supports T are serrated or barbed, which prevents anything but a downward movement.

It will be noticed that, while the wire-carrier may swing to any extent, it always returns the wire to the fixed twisting mechanism.

I do not wish to confine myself to the use of the cranks E and G, as the shaft N, or its equivalent, with its crank and cam, may be placed immediately outside of the shaft, and its connections attached directly to the arms D and H.

What I claim as my invention, and desire to secure by Letters Patent, is—

1. The bar O, given a rising-and-falling movement, in combination with the sliding wire-carrier P, for the purpose specified, substantially as described.

2. In a grain-binder, the wire-carrier P, capable of a swinging adjustment in the direction of the length of the grain, in combination with a fixed receiver, substantially as described.

3. The twisting mechanism, in combination with the wire-carrier, capable of independent adjustment in the direction of the length of the grain, operating to return the point of the wire-carrier to the same relative position to the fixed twister, whatever may be the amount or direction of said adjustment, as shown and described.

4. The vibrating arm D, with the twisting mechanism mounted thereon, in combination with bar O and wire-carrier P, substantially as described.

5. The combination of the collar R and rod S with swinging bar O, for the purpose of adjustment, as described.

6. The bundle-supports T T, provided with teeth, as shown, for the purpose described.

7. The arm H, operating as described, for forcibly ejecting the bundle of grain from the machine.

8. The combination of the cam K, crank M, connection L and N, with the cranks E and G, for producing the timed movements of the arms D and H, for the purpose described.

JOHN F. STEWARD.

Witnesses:
A. STEWARD,
E. H. CLOUDMAN.